United States Patent [19]

McGarry et al.

[11] Patent Number: 5,498,763
[45] Date of Patent: Mar. 12, 1996

[54] POLYESTER-FLEXIBLE POLYMER BLOCK COPOLYMER COATED FIBER STRUCTURES

[75] Inventors: Frederick J. McGarry, Weston, Mass.; Douglas S. McBain, Norton, Ohio

[73] Assignee: GenCorp Inc., Fairlawn, Ohio

[21] Appl. No.: 217,041

[22] Filed: Mar. 24, 1994

Related U.S. Application Data

[62] Division of Ser. No. 828,081, Jan. 30, 1992, Pat. No. 5,334,441.

[51] Int. Cl.[6] .............................. D03D 3/00; B32B 7/00; D04H 1/58; D02G 3/00
[52] U.S. Cl. ................... 428/229; 428/245; 428/265; 428/267; 428/268; 428/288; 428/290; 428/378; 428/902
[58] Field of Search ..................................... 428/245, 273, 428/272, 288, 290, 229, 265, 267, 268, 378, 902

[56] References Cited

U.S. PATENT DOCUMENTS

| | | |
|---|---|---|
| 2,750,314 | 6/1956 | Bemmels . |
| 3,119,711 | 1/1964 | Starmann et al. . |
| 3,437,517 | 4/1969 | Eilerman et al. . |
| 3,651,014 | 3/1972 | Witsiepe . |
| 3,718,714 | 2/1973 | Comstock et al. . |
| 3,827,230 | 8/1974 | Marzocchi et al. . |
| 3,888,645 | 6/1975 | Marzocchi . |
| 4,031,165 | 6/1977 | Saiki et al. . |
| 4,309,473 | 1/1982 | Minamisawa et al. . |
| 4,329,438 | 5/1982 | Yamori et al. . |
| 4,478,963 | 10/1984 | McGarry . |
| 4,562,115 | 12/1985 | Hergenrother . |
| 4,748,064 | 5/1988 | Harpell et al. . |
| 4,851,474 | 7/1989 | Willis . |
| 4,913,955 | 4/1990 | Noda et al. . |
| 5,084,508 | 1/1992 | Kagaya et al. . |
| 5,122,553 | 6/1992 | Takayama et al. . |

FOREIGN PATENT DOCUMENTS

| | | |
|---|---|---|
| 0242027 | 10/1987 | European Pat. Off. . |
| 0317628 | 5/1989 | European Pat. Off. . |
| 63305159A | 6/1987 | Japan . |
| 2165548 | 4/1986 | United Kingdom . |

*Primary Examiner*—James D. Withers
*Attorney, Agent, or Firm*—Robert F. Rywalski; Samuel B. Laferty

[57] ABSTRACT

A composite material having a coated fiber structure dispersed in a polyester matrix. The coating is a block copolymer having an elastomer block bonded to an ester block. The coating provides a flexible barrier between the fiber structure and the polyester matrix which results in a strong fiber reinforced composite having better crack resistance and improved toughness. The composite is particularly suited for use as a molding compound for use in the production of automotive body panels and structural components, aircraft components, sporting goods, housings for electrical and various other consumer goods, etc.

13 Claims, 4 Drawing Sheets

POLYESTER-FLEXIBLE POLYMER BLOCK COPOLYMER COATED FIBER STRUCTURES

This is a division of application Ser. No. 07/828,081, filed Jan. 30, 1992, of Frederick J. McGarry et al., for Polyester-Flexible Polymer Block Copolymer Coated Fiber Structures and Utilization Thereof in a Polymer Matrix, now U.S. Pat. No. 5,334,441.

FIELD OF THE INVENTION

The invention relates to a molding compound having a flexible polymer block copolymer coated fiber reinforcement to provide a toughened composite material.

BACKGROUND OF THE INVENTION

Fiber reinforced composite materials are now widely used in a variety of applications where high strength to weight ratios and the ability to be readily molded into complicated shapes are desirable. Polymer composites typically comprise a fibrous or particulate reinforcement distributed in a thermosetting or thermoplastic resin matrix. In such composite materials, an applied load is transferred from the matrix to the reinforcement which is typically a very stiff material. While the reinforcement improves the strength of the matrix, the toughness and crack resistance of the composite is generally not improved and is often less than that of the matrix material alone. This reduction in toughness and crack resistance has been attributed to the high stress concentrations which normally develop at the fiber-matrix interface during loading, and to internal stresses created at the fiber-matrix interface during the curing process because of the difference between the thermal expansion coefficient of the matrix and that of the fibers.

U.S. Pat. No. 4,478,963 to McGarry relates to a composite comprising filler particles having a thin film of a reactive liquid polymer embedded in a polymeric matrix made by mixing the reactive liquid polymer and the filler in order to provide a thin film of the reactive liquid polymer on the filler particles, mixing the coated filler particles with a polymeric matrix, and forming the composite. This patent generally discloses reactive polymer coated filler materials which are embedded in a polymeric matrix to improve fracture toughness and hence does not relate to improving the crack resistance and energy to failure of composites strengthened with fiber reinforcement.

SUMMARY OF THE INVENTION

The present invention interposes a flexible barrier between the fiber structure and the matrix material of a composite to relieve internal stresses and high stress concentrations at the fiber-matrix interface. Specifically, the fiber structure is coated with a block copolymer, having a flexible B block and an unsaturated polyester A block, before the fiber structure is distributed in the matrix. The incorporation of a flexible barrier between the fiber structure and the matrix results in a reinforced composite having better crack resistance and improved toughness. Elastic deformation of the flexible barrier is believed to reduce stresses in the portion of the matrix adjacent to the fiber structure thereby effectively removing the mechanism for rapid crack growth and allowing the matrix to continue transferring load to the fiber structure.

DETAILED DESCRIPTION OF THE INVENTION

The composite materials of the invention comprise elastomer block copolymer coated fiber structures distributed in a thermosetting resin matrix. The fiber structure is coated with a thin film of a block copolymer having a glass-transition temperature, Tg, less than about 0° C. and preferably below −20° C.

Coatings used in accordance with the invention should preferably form a bond with the matrix which is at least as strong as the elastomer coating's tear strength, and have a modulus of elasticity less than that of both the fiber and the matrix.

The present invention relates to block copolymers generally of the ABA or AB structure or mixtures thereof where the B block is a flexible polymer or segment having a Tg of generally 0° C. or less and preferably below minus 20° C., and may contain minor amounts of $A(BA)_n$ type block copolymers where n is 2 to 5, preferably 2. The flexible block generally has one or two hydroxyl end groups, amine end groups, or carboxylic end groups and thus is monofunctional or difunctional. The A block is generally a specific class of unsaturated polyesters preferably having only a mono-, or less desirably a di-, hydroxyl, carboxylic, or amine end group. The polyester A block is generally linked to the flexible polymer B block through an ester, an amide, a urea, or a urethane group. A preferred linkage is a urethane linkage formed by reacting a hydroxyl terminated B flexible polymer with a diisocyanate and subsequently reacting the same with a monohydroxyl terminated A polyester. Alternatively, the hydroxy-terminated B polymer can be reacted with a cyclic anhydride and an oxirane using specific catalysts to give an ABA block copolymer. The copolymers of the present invention are true block copolymers in that they generally contain linear AB or ABA type structure and generally have little, if any, chain extension or branching structure.

DETAILED DESCRIPTION

The B portion of the block copolymers of the present invention can generally be any flexible polymer. Such flexible polymers are generally defined as any polymer which has a Tg of about 0° C. or less and preferably below minus 20° C., often are liquid, and are readily known in the art and to the literature, including the preparation thereof.

One such class of flexible polymers is the various conjugated dienes made from one or more monomers having from 4 to 12 carbon atoms, desirably from 4 to 8 carbon atoms with 4 or 5 carbon atoms being preferred. Examples of specific dienes include butadiene, isoprene, 2,3-dimethyl-1,3-butadiene, pentadiene, hexadiene, 4,5-diethyl-1,3-octadiene, and the like, with butadiene and isoprene being preferred. The structure of such conjugated dienes is generally such that it has a Tg within the above-noted ranges.

Such polymers are terminated with either one or two functional end groups wherein the functional end group is hydroxyl, amine, or carboxyl. Thus, the B block can be a mono- or di- hydroxyl terminated flexible polymer, a mono or diamine terminated flexible polymer, or a mono- or di- carboxyl terminated flexible polymer. Such polymers are well-known to the art and are commercially available as from the BFGoodrich Chemical Co., under the Hycar® trademark.

Another class of the B block flexible polymer is the various hydrogenated dienes or polyolefins which are mono or di-hydroxyl, carboxyl, or amine terminated. Such polymers, as well as the preparation thereof, are well known to the art and to the literature. Typical diene polymers are made from one or more conjugated dienes, having from 4 to 10 carbon atoms, such as 1,3-butadiene, isoprene, dimethyl butadiene, and the like. The polymerization of the diene monomer, typically, may be done via anionic initiation (e.g. with di-lithium hydrocarbyl initiators) or via free-radical polymerization, e.g. by initiation with hydrogen peroxide, which also introduces hydroxy end groups. In case of anionic polymerization, OH-end groups are advantageously introduced by reaction of the polymeric carbanion chain ends with ethylene oxide. These techniques are generally well known to the literature. The hydroxy-functional polydienes may be hydrogenated, for example, partially or substantially (i.e., at least 50, 70, or 90 percent of the unsaturated sites), and even completely hydrogenated, according to any conventional method known to the art and to the literature. Complete hydrogenation of various diene polymers such as 1,4-polyisoprene is equivalent to an alternating ethylene/propylene hydrocarbon polymer. The hydrocarbon polymers generally have a number average molecular weight from about 500 to 15,000 and preferably from about 1,000 to about 8,000. The polymers are desirably liquid at room temperature, but can have a melting point up to about 80° C. Preferred polymers are hydroxyl functional telechelic, hydrogenated diene polymers containing 2 to 6 and preferably 2 to 4 hydroxy end groups per polymeric molecule (polymer unit).

The hydroxyl, carboxylic or amine terminated polyolefins are generally made from one or more olefins having from 2 to 6 carbon atoms such as ethylene, propylene, butylene, and the like. Such functional polyolefins can also be made by utilizing minor amounts (i.e., up to about 50 mole percent and preferably up to 20 mole percent) of ethylenically unsaturated comonomers such as styrene, vinyl toluene, alpha-methylstyrene, divinylbenzene, and similar aromatic monomers; or vinyl monomers, such as acrylonitrile, methacrylonitrile, vinylidene chloride, and similar aliphatic vinyl monomers; or hydroxyl functional ethylenically unsaturated monomers such as 2-hydroxyl ethyl acrylate and methacrylate, 2-hydroxy propyl acrylate and methacrylate and similar hydroxy alkyl acrylates. Regardless of the type of polyolefin, it should contain either one or two hydroxyl groups per average molecule.

An especially preferred hydrogenated butadiene polymer is commercially available as Polytail H and Polytail HA sold by Mitsubishi Kasei Corp., and has the very generalized structure:

wherein X and Y are randomly distributed and the structure can contain additional —OH groups.

Still another class of the B block flexible polymer is the various mono- or di- hydroxyl, amine, or carboxyl terminated nitrile containing copolymers. These copolymers are prepared in accordance with conventional techniques well known to the art and to the literature and are generally made from one or more monomers of acrylonitrile or an alkyl derivative thereof with one or more conjugated dienes and optionally one or more monomers of acrylic acid, or an ester thereof. Examples of acrylonitrile monomers or alkyl derivatives thereof include acrylonitrile and alkyl derivatives thereof having from 1 to 4 carbon atoms such as methacrylonitrile, and the like. The amount of the acrylonitrile or alkyl derivative monomer is from about 1 percent to about 50 percent by weight and preferably from about 5 percent to about 35 percent by weight based upon the total weight of the nitrile containing copolymer.

The conjugated diene monomers generally have from 4 to 10 carbon atoms with from 4 to 6 carbon atoms being preferred. Examples of specific conjugated diene monomers include butadiene, isoprene, hexadiene, and the like. The amount of such conjugated dienes is generally from about 50 percent to about 99 percent by weight and preferably from about 55 percent to about 75 percent by weight based upon the total weight of the nitrile rubber forming monomers. Such mono or difunctional nitrile rubbers can be readily prepared generally containing either hydroxyl or carboxyl end groups and are known to the art and to the literature and are commercially available such as from The BFGoodrich Company under the tradename Hycar.

Yet another class of the B block flexible polymers is the various copolymers made from vinyl substituted aromatics having from 8 to 12 carbon atoms and conjugated diene monomers generally having from 4 to 12 carbon atoms, desirably from 4 to 8 carbon atoms, and preferably 4 or 5 carbon atoms. Examples of suitable aromatic monomers include styrene, alphamethyl styrene, and the like, with specific examples of conjugated dienes including hexadiene, isoprene, butadiene, and the like. A preferred copolymer is a random styrene butadiene copolymer. The amount of the vinyl substituted aromatic component, such as styrene, is generally from about one part to about 50 parts, and desirably from about 1 part to about 30 parts by weight, based upon the total weight of the copolymer. The preparation of such polymers having mono or di- hydroxyl, amine, or carboxyl terminated vinyl substituted aromatic conjugated diene copolymer are well known to the art and to the literature.

A still further class of the B block flexible polymers is the various polyethers which are either mono- or di- hydroxyl, amine, or carboxyl terminated. Such polyether polyols are generally made by reacting one or more alkylene oxides having from 2 to 10 carbon atoms such as propylene oxide with a strong base such as potassium hydroxide, preferably in the presence of water, glycols and so forth. Polyether polyols can also be made by ring opening polymerization of tetrahydrofuran or epichlorohydrin using acid catalysts. Examples of polyethers which can be utilized are those which are produced as by polymerization of tetrahydrofuran or epoxides (such as ethylene oxide, propylene oxide, butylene oxide, styrene oxide, or epichlorohydrin), or by addition of epoxide compounds (preferably ethylene oxide or propylene oxide), alone, in a mixture, or in succession, to starting components with reactive hydrogen atoms such as water, polyhydric alcohols, ammonia, or polyfunctional amines. The above mono- or dihydroxyl, amine, or carboxyl terminated polyethers, as well as the preparation thereof, are well known to the art and are commercially available. Hydroxy terminated polytetrahydrofurans are commercially available as from DuPont as Terethane. Hydroxy terminated polypropylene oxides are commercially available as from Dow Chemical as Voranol and amine terminated polyethers are commercially available as from Texaco as Jeffamine.

Still another class of the B block flexible polymers is the various saturated polyesters made from aliphatic dicarboxylic acids or aliphatic anhydrides and glycols, and such are well known to the art and to the literature, as is the preparation thereof, and are commercially available. The aliphatic dicarboxylic acids and anhydrides have from 1 to 10 carbon atoms, with specific examples including carbonic acid, malonic acid, succinic, glutaric acid, adipic acid, pimelic acid, suberic acid, azelaic acid, sebacic acid, the anhydride counterparts thereof, and the like, with adipic acid generally being preferred. Optionally included within the above aliphatic dicarboxylic acids are minor amounts, that is up to 20 percent by weight based upon a total weight of the acids, of an aromatic diacid such as phthalic acid, isophthalic acid, terephthalic acid, and the like. Mixtures of all of the above acids can be utilized as well. The glycols generally have from 2 to 15 carbon atoms with specific examples including ethylene glycol, propylene glycol, 1,3-butylene glycol, 1,4-butylene glycol, pentane diol, hexane diol, cyclohexanedimethanol dipropylene glycol, diethylene glycol, pinacol, and the like. Preferred glycols include diethylene glycol or a mixture of propylene glycol with ethylene glycol.

The polyester or A block is generally an unsaturated polyester having an average molecular weight of between 100 or 500 to 2,000 or 5,000 and has one, or less desirably two, functional end groups thereon such as hydroxyl, carboxyl, or amine. The polyesters are made by the copolymerization of generally cyclic ethers typically containing 2 or 3 carbon atoms in the ring and an unsaturated anhydride, as well as optional saturated anhydrides using double metal complex cyanide catalysts. Generally any cyclic oxide can be utilized such as 1,2-epoxides, oxetanes, and the like, with the cyclic ether having a total of up to 18 carbon atoms, as for example 2 carbon atoms in the ring and up to 16 carbon atoms in the side chains. Such cyclic oxide monomers can also contain one or more aliphatic double bonds and preferably only contain one aliphatic carbon to carbon double bond. Examples of suitable cyclic oxides include ethylene oxide (1,2-epoxy ethane), 1,2-propylene oxide, 1,2-butene oxide, 1,2-hexene oxide, 1,2-dodecane monoxide, isobutylene oxide, styrene oxide, 1,2-pentene oxide, isopentene oxide, 1,2-heptene oxide, allyl glycidyl ether, isoheptene oxide, 1,2-octene oxide, methyl glycidyl ether, ethyl glycidyl ether, phenyl glycidyl ether, butadiene monoxide, isoprene monoxide, styrene oxide, tolyl glycidyl ether, 1,2-pentadecene oxide, epichlorohydrin, glycidoxypropyltrimethoxysilane, and the like. Generally, ethylene oxide, propylene oxide, and butylene oxide are preferred.

Generally five-member cyclic anhydrides are preferred, especially those having a molecular weight between 98 and 400. Mixed anhydrides as well as mixtures of anhydrides may be used. Examples of preferred anhydrides include those of maleic, phthalic, itaconic, nadic, methyl nadic, hexahydrophthalic, succinic, tetrahydrophthalic, 1,2-naphthalenedicarboxylic, 1,2-tetrahydronaphthalene dicarboxylic acids, and the like. Further examples include such anhydrides in which hydrogen atoms have been substituted by halogen, hydroxyl or $C_{1-8}$ carbon atom alkyl, aryl or aralkyl groups such as the anhydrides of 3,4-dichlorophthalic, hexachlorodicycloheptadiene dicarboxylic (chlorendic), 8-hydroxyl-1,2-naphthalenedicarboxylic, 2,3-dimethyl maleic, 2-octyl-3-ethyl maleic, 4,5-dimethyl phthalic, 2-phenylethyl maleic, 2-tolyl maleic and the like.

As noted above, mixtures of saturated and unsaturated anhydrides can be utilized with generally maleic anhydride being preferred. Such polyesters are known to the art and to the literature and are generally made utilizing double metal cyanide complex catalysts. The method, preparation and scope of the various types of unsaturated polyesters which are suitable in the present invention are described in U.S. Pat. No. 3,538,043 which is hereby fully incorporated by reference with regard to all aspects thereof. For example, suitable catalysts for preparation of the polyester A block include zinchexacyanocobaltate and analogs thereof as well as various metalloporphyrins. Reaction temperatures generally include ambient to about 130° C. with from about 40° to about 80° C. being preferred. Such polyesters if made by utilizing maleic acid, can be isomerized with various conventional amines such as morpholine or piperidine to produce the fumarate isomer, as taught in U.S. Pat. No. 3,576,909, to Schmidle and Schmucker, which is hereby fully incorporated by reference with regard to all aspects thereof. Hydroxyl or carboxyl end groups are readily obtained by simply utilizing either an excess of the glycol or of the acid. Amine groups are added generally by post-reaction with an amine compound such as ethylene diamine, and the like. Such aspects are of course well known to the art and to the literature. Generally, such polyester A blocks have a significant molecular weight, as above 500. A preferred ester of the present invention is poly(propylenefumarate).

The monofunctional terminated unsaturated polyester A block is reacted with the B block flexible polymer to yield a block copolymer. If the flexible B block is monoterminated, an AB type block copolymer will be formed. If the flexible polymer B block is a diterminated functional polymer, an ABA type block copolymer will be formed. However, if a difunctional terminated polyester A block is utilized with a difunctional terminated flexible B block, an ABA type block copolymer is produced along with generally small amounts of an $A(BA)_n$ type block copolymer where n is 2 to 5. Typically, such mixtures contain a majority amount, that is at least 50 percent and often at least 70, 80, or even 90 percent by weight of the ABA block copolymer.

When the flexible polymer B block is hydroxyl terminated, desirably the unsaturated polyester A block contains a monofunctional, or less desirably a difunctional, terminal acid end group so that an ester reaction occurs and an ester linkage is formed. Similarly, if the flexible polymer B block contains a carboxyl terminal group, the unsaturated polyester A block end group is desirably a hydroxyl so that an ester linkage can be formed. In either situation, a conventional esterification reaction is carried out in a manner well known to the art. The net result is the formation of an AB or an ABA block polymer and possible small amounts of $A(BA)_n$ block copolymer having an ester linkage between the blocks.

If the flexible B block is amine terminated, desirably the polyester A block has a monocarboxylic acid functional end group. Such a reaction is carried out in a conventional manner and results in an amide linkage. Alternatively, if the polyester A block is amine-terminated, a diisocyanate can be reacted with a mono- or di- hydroxyl terminated B block, so that the reaction product thereof with the amine-terminated A block results in a urea linkage.

Regardless of the type of linkage formed between the "A" block and the "B" block, the reaction conditions for forming such linkages are well known to the art and to the literature, and result in the formation of a novel block copolymer. Such reactions including the conditions thereof, etc., as well as the linkage reactions set forth hereinbelow are morely fully defined in *Advanced Organic Chemistry, Reactions, Mechanisms, and Structures*, J. March, 2nd Edition, McGraw Hill, New York, N.Y., 1977, which is hereby fully incorporated by reference including subsequent editions thereof.

It is to be understood that the A and B type blocks are typically preformed polymers which are reacted together and that no in situ polymerization of the A block or the B block occurs. In other words, the present invention is generally free of in situ polymerization or polymerization of one of the blocks on an existing block when the molecular weight of the A block is from about 500 or 600 to about 5,000.

It is also within the scope of the present invention to utilize a polyester A segment of very low molecular weight, such as for example from about 100 to about 500 or 600, wherein the ester segment or A block is merely the in situ reaction of a single or a few dicarboxylic anhydride and cyclic oxide molecules, such as maleic anhydride and propylene oxide. Preferably, the flexible B block is hydroxyl terminated. Such low molecular weight polyester A blocks result in a block copolymer having a high ratio or amount of the flexible polymer A block.

To prepare such low molecular weight A segments or blocks, it is advantageous to react the hydroxy terminated flexible B segment directly with the cyclic anhydride and propylene oxide. Suitable catalysts for the reaction include the double metal cyanide complex catalysts described above as well as the various titanates and alkyl substituted tin compounds like dibutyltin oxide. Preferred anhydrides for making such low molecular weight A segments have unsaturation such as maleic, tetrahydrophthalic, itaconic, nadic, methyl nadic and the like, although mixtures of unsaturated and saturated cyclic anhydrides may also be used. Generally, any cyclic oxide can be used with ethylene and propylene oxides being preferred.

According to the preferred embodiment of the present invention, the flexible polymer B block is hydroxyl terminated and is reacted with a monohydroxyl terminated unsaturated polyester A block through the utilization of a polyisocyanate to yield a block copolymer having a minimum weight of 500 or 600. That is, a polyisocyanate is reacted with the hydroxyl end group of the flexible polymer B block thereby leaving a free isocyanate group which is subsequently reacted with the hydroxyl end group of the unsaturated polyester A block. Examples of polyisocyanates which can be utilized generally have the formula where n is generally about 2 (i.e. a diisocyanate) although it can be slightly higher or lower as when mixtures are utilized. R is an aliphatic having from about 2 to about 20 carbon atoms with from about 6 to about 15 carbon atoms being preferred or an aromatic including an alkyl substituted aromatic having from about 6 to about 20 carbon atoms, with from about 6 to about 15 carbon atoms being preferred, or combinations thereof. Examples of suitable diisocyanates include 1,6-diisocyanato hexane, 2,2,4-and/or 2,4,4-trimethyl hexamethylene diisocyanate, p-and m-tetramethyl xylene diisocyanate, dicyclohexylmethane-4,4'-diisocyanate (hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate, (IPDI) isopropylene-bis-(p-phenyl isocyanate) and sulfone-bis-(p-phenyl isocyanate). Also useful are diisocyanates prepared by capping low molecular weight, that is less than 300, diols, ester diols or diamines with diisocyanates, such as the reaction products of one mole of 1,4-butanediol or bis-(4-hydroxylbutyl)-succinate (molecular weight=262) with two moles of hexamethylene diisocyanate. TDI and IPDI are preferred for reasons set forth herein below. The reaction between the diisocyanate and the hydroxyl terminated flexible polymeric B block is carried out in an inert atmosphere such as nitrogen, at ambient temperatures and up to 30° C., desirably in the presence of urethane catalysts. Such catalysts are known to the art as well as to the literature and generally include tin compounds such as various stannous carboxylates, for example stannous acetate, stannous octoate, stannous laurate, stannous oleate and the like; or dialkyl tin salts of carboxylic acids such as dibutyltin diacetate, dibutyltin dilaurate, dibutyltin maleate, dibutyltin di-2-ethylhexoate, dilauryltin diacetate, dioctyltin diacetate and the like. Similarly, there can be used a trialkyltin hydroxide, dialkyltin oxide or dialkyltin chloride. As an alternative or in addition to the above tin compounds, various tertiary amines can be used such as triethylamine, benzyldimethylamine, triethylenediamine and tetramethylbutanediamine. The tin catalysts, when utilized, are generally used in amounts of 0.5 parts or less, i.e., in the range of about 0.01 to 0.5 parts, by weight per 100 parts of prepolymer. The tertiary amine catalysts, when utilized, can be used in amounts of 0.01 to about 5 parts by weight per 100 parts of prepolymer.

It is an important aspect of the present invention that the reaction of the diisocyanate with mono- or di- hydroxyl terminated flexible polymer B block occurs separately, that is, not in the presence of, in the absence of, or free from the mono- or di- hydroxyl functional unsaturated polyester A block. This ensures that a random copolymer containing block segments therein is not produced. Moreover, it is another important aspect of the present invention to utilize diisocyanate catalysts which have differential reaction rates with regard to the two isocyanate end groups. This is to ensure that only one of the groups reacts with the hydroxyl terminated flexible B block and the remaining unit generally remains unreacted until subsequent reaction of the monohydroxyl terminated polyester A block. For this reason, TDI and IPDI are preferred. The amount of the diisocyanate utilized is generally an equivalent amount to the hydroxyl groups in the flexible B block and thus is an equivalent ratio of from about 0.8 to about 1.2, and desirably from about 0.9 to about 1.1. Similarly, the amount of the polyester block A is generally an equivalent amount to the urethane linkages of the flexible B block, be it one linkage or two linkages per B block.

The mono- or di- hydroxyl terminated unsaturated polyester A block is then subsequently added to the vessel or solution containing the urethane terminated flexible polymer B block and reacted therewith in a conventional manner well known to the art and to the literature. The result is a urethane linkage between the polyester A block and the flexible polymer B block.

A distinct advantage of utilizing the urethane reaction route is that a low temperature reaction can be carried out which minimizes side reactions and that no unreacted compounds remain which have to be removed from the reaction product.

Another method of making a mixture of block copolymers containing a large amount of AB block copolymer is to react a diisocyanate-terminated flexible polymer B block having two free NCO groups thereon with an approximately equivalent amount of a low molecular weight alcohol and then subsequently reacting the product with an approximately equivalent amount of the functional terminated unsaturated polyester A block. The flexible polymer B block will contain a mixture of alcohol terminated end groups, unreacted urethane end groups, or both. The low molecular weight alcohol can be methanol, ethanol, n-propanol, isopropanol, t-butanol, and the like. In lieu of the low molecular weight saturated alcohol, a functional compound containing an ethylenically unsaturated polymerizable group can be utilized, such as hydroxy-styrene, hydroxy-ethyl-acrylate, methacrylate, or allyl alcohol.

Another preferred embodiment relates to the preparation of the low molecular weight A blocks which involves the reaction of hydroxyl terminated B blocks with a cyclic unsaturated anhydride and an alkalene oxide as noted above. Mixtures of saturated and unsaturated anhydrides can also be used.

Another aspect of the present invention is that the above-noted AB, or ABA, or $A(BA)_n$ block copolymers can be cured. Curing can occur utilizing conventional compounds such as ethylenically unsaturated compounds, for example vinyl or allyl compounds, and conventional free radical catalyst. Examples of ethylenically unsaturated compounds include styrene, a preferred compound, vinyl toluene, divinyl benzene, diallyl phthalate, and the like; acrylic acid esters and methacrylic acid esters wherein the ester portion is an alkyl having from 1 to 10 carbon atoms such as methylacrylate, ethylacrylate, n-butylacrylate, 2-ethylhexylacrylate, methyl methacrylate, ethylene glycol dimethacrylate, and the like. Other unsaturated monomers include vinyl acetate, diallyl maleate, diallyl fumarate, vinyl propionate, triallylcyanurate, and the like, as well as mixtures thereof. The amount of such compounds based upon 100 parts by weight of the block copolymers can generally vary from about 1 to about 500 parts by weight, and desirably from about 1 to about 100 parts by weight. The free radical initiators can include organic peroxides and hydroperoxides such as benzoyl peroxide, dicumyl peroxide, cumene hydroperoxide, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like.

The invention will be understood by reference to the following examples setting forth the preparation of unsaturated polyester-blocked flexible polymer compositions.

EXAMPLE 1

Poly(propylene fumarate)-b-poly(butadiene)-b-poly(propylene fumarate) triblock

In a 1-L resin kettle equipped with thermometer, heating mantle and stirring were charged 203 g (70 mmoles —OH) of BFG Hycar 2,000×169 (a dihydroxy-terminated polybutadiene), 263 g of styrene, 15.7 g (141 mmoles total —NCO) of isophorone diisocyanate, 2.3 g of zinc stearate, and 1.4 g of DABCO T9 catalyst. The materials were mixed thoroughly under nitrogen and warmed to 70° C. After two hours 80 g (70 mmoles —OH) of a 80 percent solids in styrene solution of a mono-hydroxy unsaturated polyester (polypropylene fumarate, 850 MW) was added to the reaction mixture, along with 2.5 g of 10 percent benzoquinone in diallyl phthalate, and 0.5 g of DABCO T9 catalyst. The reaction mixture was cooled after three hours to room temperature, and the solution poured into a suitable container. The triblock had a flexible polymer to unsaturated polyester weight ratio of 3.2 to 1.0, and contained 50 percent solids in styrene.

EXAMPLE 2

Poly(propylene fumarate)-b-poly(butadiene-CO-acrylonitrile)-poly(propylene fumarate) triblock The above triblock was prepared by charging a 2-L resin kettle as above with 600 g (370 mmoles —OH) of Hycar 1300×34 (a dihydroxy-terminated poly(butadiene-CO-acrylonitrile, 26 percent AN content) and 480 g of styrene which was stirred overnight under nitrogen to dissolve. To the stirred solution was then added 52 g (600 mmoles total —NCO) of toluene diisocyanate, and 2.0 g DABCO T12 catalyst. The mixture was stirred for one-half hour during which time the temperature rose to 37° C., followed by the addition of 675 g (350 mmoles —OH) of an 80 percent solids in styrene solution of a monohydroxy unsaturated polyester (polypropylene fumarate, approx. 1600 MW). The mixture was kept at 37° C. with stirring for six hours, and then poured into a container. The triblock had a flexible polymer to unsaturated polyester weight ratio of 1.1 to 1.0, and contained 65 percent solids in styrene.

EXAMPLE 3

Poly(propylene fumarate)-b-poly(butadiene) block copolymer

The above block copolymer was prepared by charging 200 g (70 mmoles —OH) of Hycar 2,000×169 to a 1-L resin kettle along with 234 g of styrene, 12.5 g (113 mmoles total —NCO) isophorone diisocyanate, 2.0 g of zinc stearate, and 2.0 g DABCO T9 catalyst. The starting materials were mixed thoroughly under nitrogen, and then heated to 70° C. After 90 minutes, 1.7 g (28 mmoles —OH) of n-propanol was added, and after 2.5 hours 36 g (32 mmoles) of an 80 percent solids in styrene solution of a monohydroxy unsaturated polyester (polypropylene fumarate, approx. 1400 MW). The mixture was stirred for another three hours, then cooled and transferred to a suitable container. The block copolymer had a flexible polymer to unsaturated polyester weight ratio of 7.0 to 1.0, and contained 53 percent solids in styrene. This composition was a mixture containing large amounts of an AB block copolymer.

EXAMPLE 4

Poly(propylene fumarate)-b-poly(butadiene-CO-acrylonitrile) block copolymer

The above block copolymer was prepared in a 1-L resin kettle as above with a charge of 361 g (225 mmoles —OH) Hycar 1300×34 and 175 g (210 mmoles total —OH) of 80 percent solids in styrene solution of dihydroxy unsaturated polyester (polypropylene fumarate, approximately 1400 MW), which were mixed thoroughly at 110° C. under vacuum for 90 minutes. The blend was cooled to 80° C. under nitrogen, and 21.6 g (250 mmoles total —NCO) of TDI added followed by stirring for ten minutes. DABCO T-12 catalyst (0.8 g) was added, causing an immediate increase in viscosity. Stirring was continued for one hour and the mixture cooled to 50° C., followed by the addition of 531 g of styrene. The solution was transferred to a suitable container. The flexible polymer to unsaturated polyester weight ratio of this additive was 2.6 to 1.0, and the solution contained 48 percent solids in styrene. This composition was a mixture containing $A(BA)_n$ block copolymers.

EXAMPLE 5

Poly(propylene fumarate)-b-poly(butadiene-co-acrylonitrile) block copolymer

The above block copolymer was prepared by charging a 500-ml resin kettle with 189 g of a solution of Hycar 1300×31 (dicarboxy terminated polybutadiene-coacrylonitrile, 10 percent AN content; 48.5 weight percent, 91.5 g, 51 mmoles carboxyl) and dihydroxy terminated polypropylene fumarate (1300 MW; 51.5 percent, 97.5 g, 150 mmoles —OH). The kettle was heated under vacuum at 150 to 160° C. for two hours to remove water. The product was transferred to a suitable container. The block copolymer had a flexible polymer to unsaturated polyester weight ratio of 0.9 to 1.0. This composition contained ABA block copolymers.

EXAMPLE 6

Poly(propylene fumarate)-b-poly(butadiene-co-acrylonitrile) block copolymer

The above block copolymer was prepared by charging a 1.5-L resin kettle with 508 g (726 mmoles —OH) of unsaturated polyester (dihydroxy terminated polypropylene fumarate, approximately 1400 MW) 404 g (234 mmoles carboxyl of Hycar 1300×13 (dicarboxy terminated polybutadiene-co-acrylonitrile, 26 percent AN content), 0.4 g benzoquinone, and 0.4 g of triphenylphosphonium bromide. The mixture was stirred and heated to 150° C. under vacuum for four hours. After cooling to room temperature, 508 g of styrene was added and mixed to dissolve the polymer. The product was transferred to a suitable container. The block copolymer had a flexible polymer to unsaturated polyester ratio of 0.8 to 1.0, and contained 57 percent solids in styrene. This composition contained ABA block copolymers.

EXAMPLE 7

Poly(propylene fumarate)-b-poly(tetrahydrofuran)-b-poly(propylene fumarate) triblock The above triblock was prepared by combining 400 grams of isocyanate-terminated poly(tetrahydrofuran 347 mmoles NCO), available from Air Products under the trademark PET90A, 312 grams of toluene, 3 grams of DABCO T9® catalyst, available from Air Products and Chemical Inc., and 224 grams of a solution of monohydroxy-terminated poly(propylene fumarate) (80 percent solids in styrene, 347 mmoles total —OH) in a one liter resin kettle equipped with nitrogen purge, a heating mantle, and a stirrer. The reagents were thoroughly mixed at room temperature under nitrogen, after which the contents were heated and maintained at 40° C. until the reaction was complete. The progress of the reaction was monitored using FTIR. Completion of the reaction was marked by the disappearance of the —NCO absorbance from the IR spectrum, at which time the product was cooled to room temperature. This triblock copolymer had a flexible polymer to unsaturated polyester ratio of approximately 2 to 1.

EXAMPLE 8

A poly(propylene fumarate)-b-poly(butadiene)-b-poly(propylene fumarate) triblock The above triblock was prepared by combining, in a one liter resin kettle equipped with nitrogen purge, heating mantle, and stirrer, 500 grams of hydroxy-terminated polybutadiene (137 mmoles total OH), available from the BFGoodrich Chemical Company under the trademark HYCAR 2,000×169®, 310 grams of toluene, 31 grams of isophorone diisocyanate having 279 mmoles total —NCO, and 3 grams of DABCO T9®catalyst. The contents were thoroughly mixed under nitrogen, and then warmed to 60° C. for 2.5 hours. To the kettle were added 93 grams of a solution of monohydroxy-terminated poly(propylene fumarate) (80 percent solids in styrene, 144 mmoles total —OH), and 150 grams of toluene to reduce the viscosity. The contents were reacted for about 3 hours at 60° C. until the IR spectrum indicated complete consumption of —NCO. The product was then cooled to room temperature. This triblock copolymer had a flexible polymer to unsaturated polyester ratio of 6.2 to 1.0.

EXAMPLE 9

Hydroxypropylmaleate-b-Poly(diethyleneadipate)-b-hydroxypropylmaleate triblock

A 1-quart polymerization bottle was charged with 156.5 g (313 mmoles —OH) of Formrez 11-112 (a dihydroxy poly(diethylene adipate), available from Witco Chemical Co.), 30.7 g of maleic anhydride (313 mmoles), 124 g of toluene as solvent, and 0.3 g of tetrabutyl titanate catalyst. The bottle was sealed and heated in a waterbath to 80° C. On completion of the reaction of the maleic anhydride as determined by FTIR, 19.1 g of propylene oxide (329 mmoles) was charged to the bottle, and the reaction completed at 65° C. Determination of acid number and NMR indicated 100 percent maleic anhydride capping, and approximately 80 percent hydroxy propyl ester formation. This triblock copolymer had a flexible polymer to unsaturated polyester ratio of approximately 3.1 to 1.

EXAMPLE 10

Hydroxypropylmaleate-b-Poly(propylene adipate)-b-hydroxypropylmaleate triblock

A 1-quart polymerization bottle was charged with 407.3 g (1.63 mmoles —OH) of Formrez 33-225 (a dihydroxy poly(propylene adipate), available from Witco Chemical Co.), 160.1 g maleic anhydride (1.63 mmoles), 153 g toluene as solvent, and 1.7 g of tetrabutyl titanate catalyst. The bottle was sealed and heated in a waterbath to 80° C. On completion of the reaction of the maleic anhydride as determined by FTIR, 94.7 g of propylene oxide (1.63 mmoles) was charged to the bottle, and the reaction completed at 65° C. Determination of acid number and NMR indicated 100 percent maleic anhydride capping, and approximately 80 percent hydroxypropyl ester formation. This triblock copolymer had a flexible polymer to unsaturated polyester ratio of approximately 1.6 to 1.

The above examples are illustrative of coating preparations having a flexible segment suitable for use with the invention and, accordingly, should not be regarded as limiting on the scope of the invention.

FIBER STRUCTURE

Considering the fiber structure, generally, any reinforcing fiber such as glass, aramid, nylon, polyester, graphite, boron, and the like, can be utilized in the invention. Fiber structure suitable for incorporation into the matrix include generally individual fibers, various types of woven fibers, or any general type of nonwoven fibers. Included within the woven class is any general type of woven fabrics, woven roving, and the like. Generally included within the nonwoven class is chopped strands, continuous filaments or rovings, reinforcing mats, nonreinforcing random mats, fiber bundles, yarns, non-woven fabrics, etc. Coated fiber bundles, comprising about 5 to about 50 or 150 strands, each having about 10 to about 50 fibers, highly bonded together with a conventional sizing agents such as various amino silanes, are preferred. The fiber structure may be randomly distributed within the matrix or be arranged in selected orientations such as in parallel or cross plies or arranged in mats or woven fabrics, etc. The fibers may comprise from about 5 percent up to about 85 percent by weight of the composite and preferably from 20 percent to 50 percent by weight of the composite. The specific quantity of fiber structure in the composite can be varied consistent with the physical properties desired in the final composite molded article.

Conventional spraying, dipping or other coating techniques are used to coat the fibers and do not constitute a part of the invention. One method of controlling the coating thickness is by varying the amount of coating dispersed in a diluent. The amount of polyester-elastomer block copolymer coating in the solution bath needed to produce a desired thickness depends on the characteristic of the elastomer, the diluent, and the fibers. The thickness of the block copolymer coating should generally be from about 0.1 percent to about 10 percent of the fiber diameter and preferably from about 0.5 percent to about 2 percent of the fiber diameter. When the fiber structure is a roving, a bundle, etc., i.e. a plurality of fibers, the thickness of the coating is generally from about 0.1 percent to about 10 percent of the diameter of the roving, bundle, etc., and preferably from about 0.5 percent to about 2 percent.

After the fiber structure is coated, it is dried and generally cured to crosslink the block copolymer to prevent it from dissolving in the matrix. Suitable curing agents for the coating include ethylenically unsaturated monomers which can, as is well known in the art, be used in association with a suitable initiator. Examples of such catalysts include organic peroxides and hydroperoxides such as benzoyl peroxide, dicumyl peroxide, cumene hydroperoxide, paramethane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photosensitive agents such as benzophenone, triphenylphosphine, organic diazos, and the like. A particularly suitable curing agent is styrene which can be used with benzoyl peroxide initiator.

The matrix material of the invention is generally an unsaturated polyester resin. Suitable unsaturated polyester resins which can be utilized in the present invention are well known to the art and to the literature and include products of the condensation reaction of low molecular weight diols, (that is, diols containing from 2 to 12 carbon atoms and desirably from 2 to 6 carbon atoms) with dicarboxylic acids or their anhydrides containing from 3 to 12 carbon atoms and preferably from 4 to 8 carbon atoms provided that at least 50 mole percent of these acids or anhydrides contain ethylenical unsaturation. Examples of diols include 1,2-propylene glycol, ethylene glycol, 1,3-propylene glycol, diethylene glycol, di-1,2-propylene glycol, 1,4-butanediol, neopentyl glycol, and the like. A preferred diol is propylene glycol. Mixtures of diols may also be advantageously used. Preferred acids include fumaric acid, maleic acid, whereas preferred anhydrides include maleic anhydride. Often, mixtures of acids and/or anhydrides are utilized with the preferred acids or anhydrides and such compounds include phthalic anhydride, isophthalic acid, adipic acid, glutaric acid, and the like, catalyzed by compounds such as organotitanates and organo tin compounds such as tetrabutyl titanate or dibutyl tin oxide, and the like.

Various other types of unsaturated polyesters can be utilized. Another type is described in R. J. Herold U.S. Pat. No. 3,538,043 which is hereby fully incorporated by reference. Typically, the polyesters are made by interpolymerization of maleic anhydride with oxiranes substituted with alkyls containing from 0 to 4 carbon atoms. Examples of oxiranes include ethylene oxide, propylene oxide, and butylene oxides. In addition to maleic anhydride, other anhydrides can be utilized in amounts up to 50 mole percent (i.e. from 0 to 50 mole percent) of the total anhydride charge, wherein said anhydride has from 4 to 10 carbon atoms, such as phthalic anhydride, nadic anhydride, methyl nadic anhydride, tetrahydrophthalic anhydride, succinic anhydride, and cyclohexane-1,2-dicarboxylic acid anhydride. The molar ratio of oxirane to anhydride can be from about 1.0 to about 2.0, and preferably from about 1.0 to about 1.3. An excess of oxirane is preferred in the preparation of the polyesters so that the final product has a low content of carboxylic acid end groups and a high content of hydroxyl end groups.

In the preparation of the unsaturated polyesters from oxiranes and anhydrides, small amounts of initiators are utilized as from about 5 to about 30 parts by weight per 100 parts by weight of the polyester forming monomers. Examples of specific initiators include polyols, for example diols, triols, tetrols, having from 2 to 12 carbon atoms, or dicarboxylic acids containing from 3 to 10 carbon atoms, as for example fumaric acid, succinic acid, glutaric acid, and adipic acid. The molecular weight of the polyol is generally less than 500, preferably less than 200. Diols and dicarboxylic acid initiators result in linear, difunctional polyester chains with an average of two hydroxyl end groups per polymer chain. Triols produce polyester chains with an average of 3 arms and 3 hydroxyl end groups, and tetrols result in 4 arm chains with 4 hydroxyl end groups. Various catalysts can be utilized such as a zinc hexacyano cobaltate complex, and the like, as described in U.S. Pat. No. 3,538,043 which is hereby fully incorporated by reference.

Regardless of whether an unsaturated polyester made from an oxirane or a diol is utilized, the molecular weight thereof is from about 1,000 to about 10,000 and preferably from about 1,200 to about 5,000.

Another important component of a typical molding composition of the present invention is an ethylenically unsaturated monomer or crosslinking agent such as a polymerizable vinyl or allyl compound, such as a vinyl substituted aromatic having from 8 to 12 carbon atoms, as for example styrene, a preferred monomer, vinyl toluene, divinyl benzene, diallyl phthalate, and the like; acrylic acid esters and methacrylic acid esters wherein the ester portion is an alkyl having from 1 to 10 carbon atoms such as methylacrylate, ethylacrylate, N-butylacrylate, 2-ethyl-hexylacrylate, methyl methacrylate, ethylene glycol dimethacrylate, and the like. Other unsaturated monomers include vinyl acetate, diallyl maleate, diallyl fumarate, vinyl propionate, triallylcyanurate, and the like. Mixtures of the above compounds can also be utilized. The total amount of the unsaturated monomers generally varies from about 20 percent to about 50 percent and desirably from about 30 percent to about 40 percent by weight based upon the total weight of the ethylenically unsaturated monomers and the polyester.

Various other components or additives can be utilized to form the molding compound composition. For example, various thermoplastic polymers (low profile or low shrinkage compounds) can be utilized as set forth in U.S. Pat. No. 4,525,498 which is hereby fully incorporated by reference. Typical low profile compounds include polyvinyl acetate, saturated polyesters, polyacrylates or methacrylates, saturated polyester urethanes, and the like. The amount of such polymers is from about 10 parts by weight to about 50 parts by weight, with from about 20 parts by weight to about 40 parts by weight being preferred based upon the weight of unsaturated polyester and the amount of ethylenically unsaturated monomer in the mixture. Other additives which can also be utilized are known to the art and to the literature and include internal mold release agents such as zinc stearate; mineral fillers such as calcium carbonate, Dolomite, clays, talcs, zinc borate, perlite, vermiculite, hollow glass, solid glass microspheres, hydrated alumina, and the like.

In addition to polyesters, other suitable matrix materials include vinyl ester resins. The structure of a typical vinyl ester resin is where R is a hydrogen atom or an alkyl group. Vinyl ester resins are prepared by reacting epoxy resins such as the addition products of 1-chloro-2,3-epoxypropane with 2,2'-bis(4-hydroxyphenyl)propane with either methacrylic or acrylic acid. The terminal unsaturation can be crosslinked with styrene in the same fashion as an unsaturated polyester. Conventional catalysts can be used to cure the matrix.

Examples of such catalysts for the cure of unsaturated polyester or vinyl ester resins include organic peroxides and hydroperoxides such as benzoyl peroxide, dicumyl peroxide, cumene hydroperoxide, paramethane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like.

The composite material of the invention provides a toughened molding material having better crack resistance and which can be molded to form automotive body panels, automotive structural components such as load bearing support members, aircraft components, housings for various electrical and household goods, sporting goods such as golf club shafts, rackets, etc. The composite is preferably prepared as a sheet molding compound (SMC) which can be shaped and cured in a compression molding process; however, compositions made in accordance with the invention can be utilized in wet layup, resin transfer molding, bulk molding, and the like.

The invention will be better understood by reference to the following examples.

PREPARATION OF SPECIMENS

Sheet molding compounds having uncoated fibers and triblock coated fibers, were prepared to test the effects of the flexible coating on various physical parameters relating to the toughness of composites prepared in accordance with the invention. One of the triblock coated fibers utilized a triblock wherein the flexible block was poly(tetrahydrofuran) and hence will be referred to as a THF triblock. Another triblock was a utilized wherein the flexible portion was a poly(butadiene) and will be referred to as a PB triblock.

Glass fibers in the form of rovings having about 20 strands of 30 to 40 glass fibers highly bound together with sizing were coated with THF triblock solutions and PB triblock solutions. Each solution consisted of THF triblock or PB triblock, 40 parts by weight of styrene per 100 parts by weight of triblock, 1.5 parts by weight of benzoyl peroxide per 100 parts by weight of triblock and toluene. Styrene is used as a crosslinking agent and benzoyl peroxide is used to initiate the crosslinking reaction. The toluene is used to control the thickness of the coating on the glass fiber strands. Fiber specimens were prepared using THF triblock solutions having 4 percent, 6 percent, 8 percent and 10 percent THF triblock by weight. Coated fiber specimens were also prepared using PB triblock solutions having 4 percent and 6 percent PB triblock by weight. After the fibers were coated, they were dried. The fibers were then cured for 2 hours at 80° C., 1 hour at 100° C. and for 1 hour at 120° C. After curing, the fibers were chopped into approximately 1" long segments and incorporated into a paste to form sheet molding compounds.

The composition of the paste is shown in Table I. The polyester, the low profile additive, styrene, initiator and hydroquinone were mixed using a high speed mixer. Next, zinc stearate and calcium carbonate were slowly added to the wet mixture. After all the calcium carbonate was dispersed, magnesium oxide was added.

TABLE I

| Recipe for SMC Paste | |
|---|---|
| Ingredients | Weight % |
| Unsaturated Polyester (66% solids in styrene) | 13.8 |
| Polyvinyl Acetate (45% solids in styrene) | 9.2 |
| Styrene | 3.7 |
| Hydroquinone | 0.005 |
| t-Butyl Peroxy Benzoate | 0.25 |
| BYK ®-W995* | 0.8 |
| Zinc Stearate | 1.0 |
| $CaCO_3$ | 69.7 |
| MgO dispersion | 1.4 |

*BYK ®-W995 is a viscosity reducer available from BYK-Chemie USA

The sheet molding compounds were prepared by pouring approximately 200 grams of paste onto a teflon sheet, covering the paste with a second teflon sheet and spreading the paste uniformly between the two sheets, separating the top sheet from the paste and uniformly distributing a layer of randomly oriented fibers. The process was repeated to create a compound having a total of nine alternating layers of paste and fibers. The compound was then pressed between two teflon sheets which were sealed with tape along their edges and kneaded to obtain substantially complete and uniform fiber wetting throughout the composite.

After the kneading process, the composite was allowed to cure at room temperature for 48 hours causing it to thicken from about 100 Poise to about $10^6$ Poise.

Charges of 170 grams were cut from each of the matured sheet molding compounds and placed in a highly waxed mold having cavity dimensions of 6" by 7". The mold was preheated to 300° F. before being charged. The charges were molded for 90 seconds at 1000 psi. A charge of 170 grams produced a composite having a thickness of 0.10 inches. Upon opening the mold, the composite was blasted with cold air for 15 seconds then quickly ejected using a manual ejection pin.

Molded specimens were cut to 3"×0.75" with a diamond saw and the edges of the specimens were polished with 60 grip paper and then with 400 grit paper. The specimens were examined and those having any cracks or scratches were discarded.

STRAIN TO FIRST CRACK

The strain to first crack was determined by placing a specimen on a bending device and loading the sample just enough to prevent slippage of the specimen. An initial micrometer reading was taken for each sample. The load is gradually increased in increments of 0.003 percent strain. After each incremental increase in strain, each specimen was wiped with india ink and examined under an optical microscope for defects which cause the surface to buckle. When the first crack was found a final micrometer reading was taken.

Cumulative probability of a first crack versus percent strain graphs were developed for each composition and thickness of elastomer. The cumulative probability of first crack for each sample type was found by dividing the number of specimens of that type that cracked at or below a given strain by the total number of specimens of that type tested. The cumulative distribution functions for coated and uncoated fibers are shown in FIGS. 1 and 2.

Figure 1:
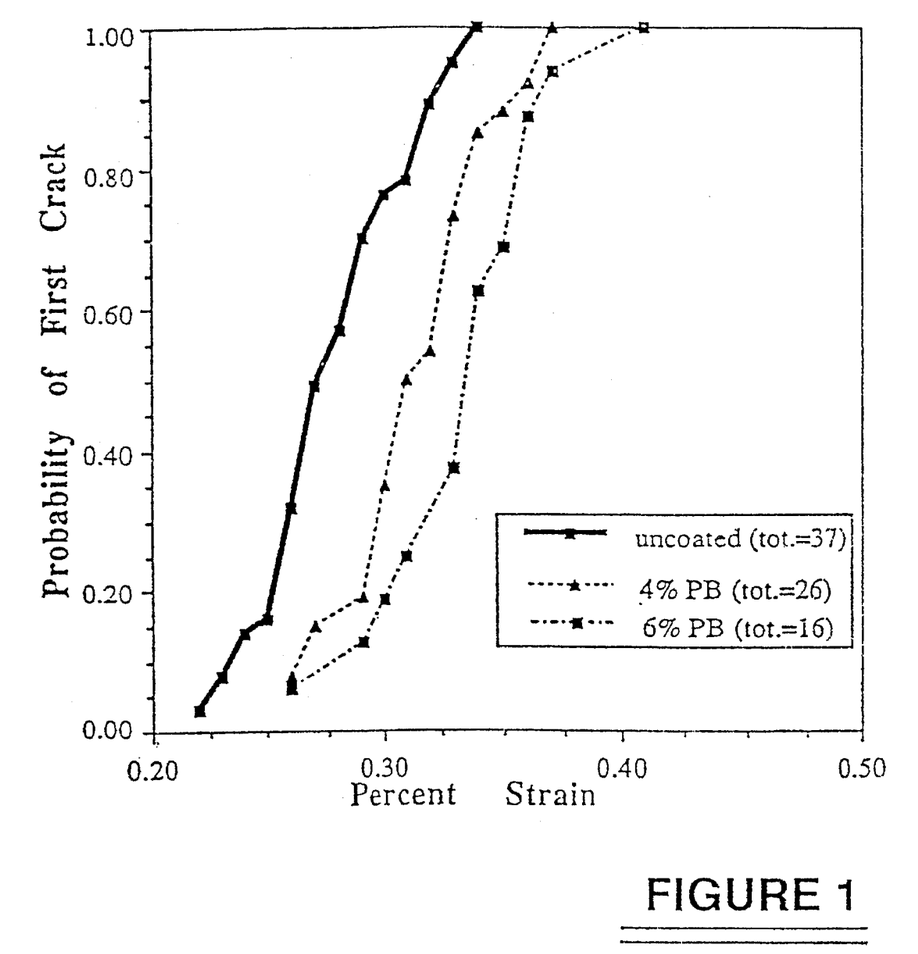
FIGS. 1 and 2 are graphs showing the cumulative probability of first crack as a function of percent strain comparing specimens prepared in accordance with the invention to specimens having uncoated fibers but which were otherwise substantially identical with those of the invention.

The results shown in FIG. 1 clearly demonstrate that PB coating on the fibers has substantially decreased the probability that a sample will crack at a given strain. These results also show that the greatest difference is between coated and uncoated fibers, rather than between types or thicknesses of coatings.

Figure 2:
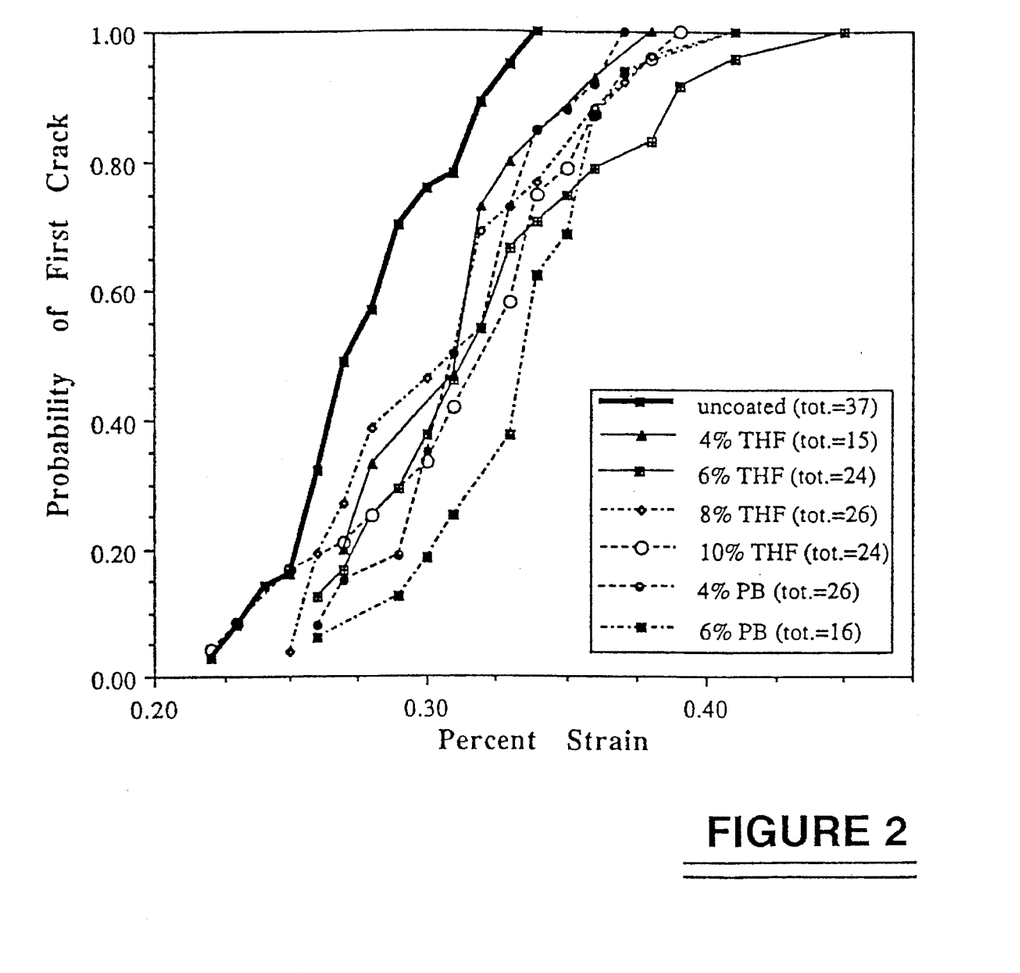

In FIG. 2, the data from FIG. 1 has been reproduced along with other data for the THF coated fiber reinforced composite specimens. While these results generally suggest that thicker coatings may perform better and that PB coatings may perform slightly better than THF coatings, the results clearly indicate that a coated fiber structure, in accordance with the invention, performs much better than an uncoated fiber structure.

FLEXURAL STRENGTH TESTING

Specimens not used in the strain to first crack experiments were used in flexural tests, the results of which are shown in Table II.

TABLE II

| Flexural Modulii (3-Point Bend Tests) | |
| --- | --- |
| Fiber Reinforced Composite | Modulus (msi) |
| Uncoated | 0.71 ± 0.16 |
| 4% THF triblock | 0.74 ± 0.16 |
| 6% THF triblock | 0.94 ± 0.16 |
| 8% THF triblock | 0.82 ± 0.13 |
| 10% THF triblock | 0.69 ± 0.13 |
| 4% PB triblock | 0.80 ± 0.14 |
| 6% PB triblock | 0.73 ± 0.15 |

The flexural modulii tests indicate that, within experimental error, the flexural modulus is about the same for composites incorporating a coating in accordance with the invention and for reinforced composites incorporating uncoated fibers. That is, the flexural modulus of a composite is not deleteriously affected by the coating of the invention.

Figure 3:
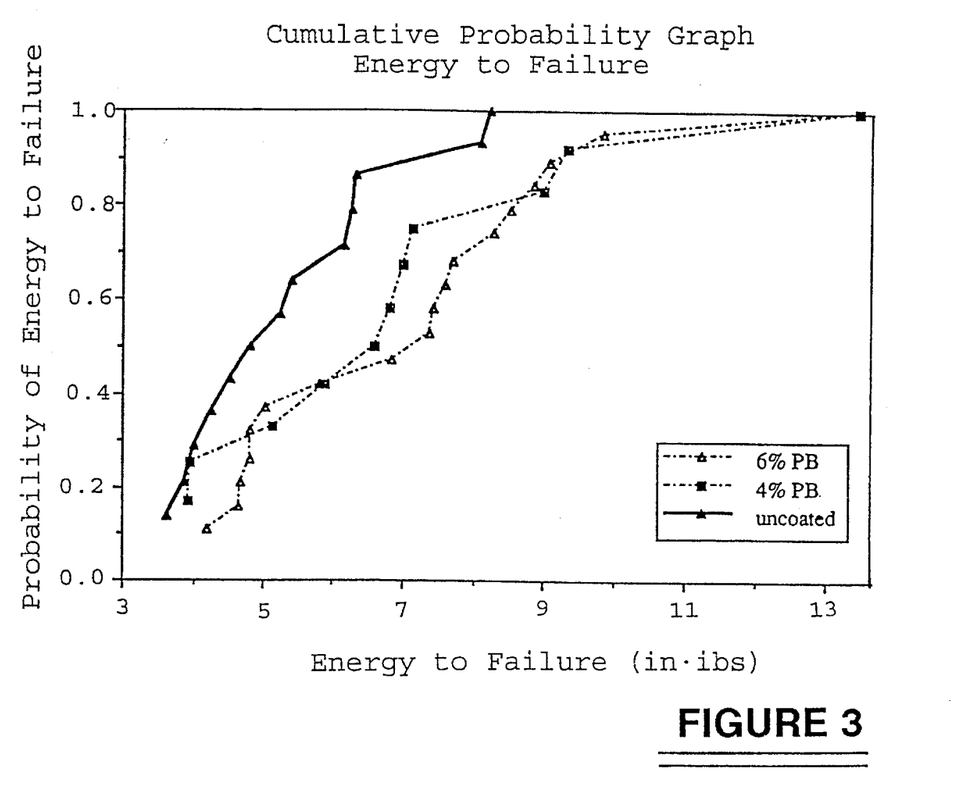
FIGS. 3 and 4 are graphs showing the cumulative probability of failure as a function of energy to failure for uncoated specimens and for elastomer coated specimens.
Figure 4:
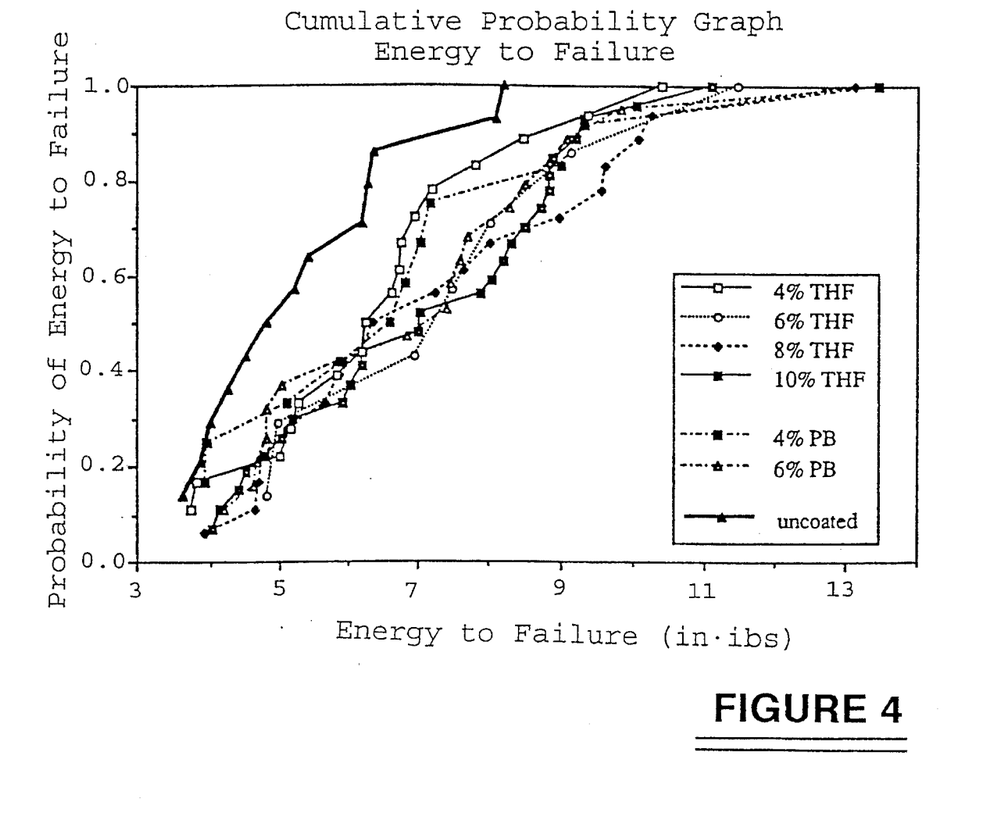

Cumulative probability curves were developed for the energy to failure for the composites, and are shown in FIGS. 3 and 4, respectively.

FIG. 3 clearly shows that the PB elastomer coating provides a distinct improvement in the amount of energy required to cause flexural failure. For example, at 0.5 probability of failure, the energy to failure for uncoated specimen is about 4.8 inch-pounds, 5.5 inch-pounds for 4 percent PB coating, and about 7.2 inch-pounds for the thicker 6 percent PB coating.

In FIG. 4, the data from FIG. 3 has been reproduced along with other data for the THF coated fiber reinforced composite specimens. The results, like with the cumulative probability of first crack, clearly indicate that any of the coated fiber structures perform much better than the uncoated fiber structures, and that the thickness and THF versus PB affects are small in relation thereto.

The results demonstrate that there is a definite improvement in the mechanical properties of the sheet molding compound when elastomer coated fibers are introduced into the composite.

While in accordance with the Patent Statutes, the best mode and preferred embodiment has been set forth, the scope of the invention is not limited there to, but rather by the scope of the attached claims.

What is claimed is:

1. A matrix reinforcement structure for distribution in a matrix resin, comprising:

a fiber structure coated with a layer of a block copolymer of the formula AB or $A(BA)_n$ where A is an unsaturated polyester having a molecular weight of from 100 to 5000, B is a flexible polymer having a Tg of 0° C. or less, and n is from 1 to 5 and wherein said fiber structure is substantially coated with said block copolymer prior to being distributed in a matrix.

2. A matrix reinforcement structure as set forth in claim 1, wherein the fiber structure is an individual fiber, a woven fabric, or a non-woven.

3. A matrix reinforcement structure as set forth in claim 1, wherein the fiber structure is glass, aramid, nylon, carbon, polyester, graphite, or boron and wherein said layer of a block copolymer has a thickness of from about 0.1 to about 10 percent of the diameter of the fiber structure.

4. A matrix reinforcement structure as set forth in claim 3, wherein said B block is a nitrile containing copolymer, a copolymer of a vinyl substituted aromatic having from 8 to 12 carbon atoms and a conjugated diene having from 4 to 12 carbon atoms, a polymer made from one or more conjugated dienes having from 4 to 12 carbon atoms, a hydrogenated polymer made from one or more conjugated dienes having from 4 to 10 carbon atoms, a polymer made from one or more olefins having from 2 to 6 carbon atoms, a polymer made from one or more cyclic ethers having from 2 to 20 carbon atoms, or a saturated polyester made from one or more dicarboxylic acids or anhydrides having from 1 to 10 carbon atoms and a glycol having from 2 to 15 carbon atoms.

5. A matrix reinforcement structure as set forth in claim 4, wherein said A block and said B block are connected by an ester linkage, an amide linkage, a urea linkage, or a urethane linkage, and wherein the Tg of said B block is minus 20° C. or less.

6. A matrix reinforcement structure as set forth in claim 5, wherein said block copolymer is cured prior to distribution of said coated fiber structure in a matrix and wherein the strength of the bond between the coating and the fiber structure is at least equal to the shear strength of the coating, and wherein said fiber structure is chopped strands, a mat, a woven fabric, a non-woven fabric, or a woven roving.

7. A matrix reinforcement structure as set forth in claim 4, wherein said B block is a saturated polyester or polymer made from one or more cyclic ethers.

8. A matrix reinforcement structure as set forth in claim 5, wherein the fiber structure is made of glass.

9. A matrix reinforcement structure as set forth in claim 5, wherein said A block has a molecular weight of from 500 to 5,000.

10. A matrix reinforcement structure as set forth in claim 9, wherein said fiber structure is made of glass.

11. A matrix reinforcement structure as set forth in claim 8, wherein said B block comprises a saturated polyester made from one or more dicarboxylic acids or anhydrides having from 1 to 10 carbon atoms and a glycol having from 2 to 15 carbon atoms.

12. A matrix reinforcement structure as set forth in claim 8, wherein said B block is a polymer made from one or more cyclic ethers having from 2 to 20 carbon atoms.

13. A matrix reinforcement structure as set forth in claim 8, wherein said B block is a polymer made from one or more conjugated dienes having from 4 to 12 carbon atoms or a copolymer of (a) a vinyl substituted aromatic having from 8 to 12 carbon atoms and (b) a conjugated diene having from 4 to 12 carbon atoms.

* * * * *

UNITED STATES PATENT AND TRADEMARK OFFICE
CERTIFICATE OF CORRECTION

PATENT NO. : 5,498,763
DATED : March 12, 1996
INVENTOR(S) : Frederick J. McGarry, et. al.

It is certified that error appears in the above-identified patent and that said Letters Patent is hereby corrected as shown below:

Title page, item [54], and col. 1, line 3, after "STRUCTURES" insert-- AND UTILIZATION THEREOF IN A POLYMER MATRIX--

Column 6, line 63, "morely" should be -- more--;
Column 17, line 5, "grip" should be -- grit--;
Column 18, line 21, "there to" should be -- thereto --.

Signed and Sealed this

Twelfth Day of November, 1996

*Attest:*

BRUCE LEHMAN

*Attesting Officer*  *Commissioner of Patents and Trademarks*